United States Patent [19]
Rieke et al.

[11] Patent Number: 5,379,749
[45] Date of Patent: Jan. 10, 1995

[54] CONDENSATE TRAP FOR MULTI-POISE FURNACE

[75] Inventors: Larry D. Rieke, Zionsville; Michael J. Larsen, Danville, both of Ind.

[73] Assignee: Carrier Corporation, Syracuse, N.Y.

[21] Appl. No.: 107,285

[22] Filed: Aug. 16, 1993

[51] Int. Cl.6 .................................. F24H 3/02
[52] U.S. Cl. .................... 126/110 R; 126/116 R; 110/203; 137/247.27; 137/247.41; 165/913
[58] Field of Search ............ 126/110 R, 99 R, 116 R, 126/99 A, 109, 110 D, 117, 106, 114; 110/203, 216; 165/913; 137/247.27, 247.41, 314, 409; 122/17, 20 B; 237/52, 53, 55

[56] References Cited
U.S. PATENT DOCUMENTS

| | | | |
|---|---|---|---|
| 4,449,511 | 5/1984 | Hays et al. | 126/110 R |
| 4,515,145 | 5/1985 | Tallman et al. | 126/110 R |
| 4,542,734 | 9/1985 | Trent et al. | 126/110 R |
| 4,603,680 | 8/1986 | Dempsey et al. | 126/110 R |
| 4,682,579 | 7/1987 | Bigham | 126/110 R |
| 4,724,328 | 3/1988 | Shellenberger | 126/110 R |
| 4,892,045 | 1/1990 | Schumacher | 110/203 |
| 4,899,726 | 2/1990 | Waterman | 126/110 R |
| 5,309,890 | 5/1994 | Rieke et al. | 126/110 R |

*Primary Examiner*—James C. Yeung

[57] ABSTRACT

There is disclosed a furnace having an air flow path for heated air and combustion products that passes through a condensing heat exchanger. Condensate forming in regions of negative and positive pressure is separately conducted to a unitary condensate trap of minimal vertical height incorporating therein separate traps for handling the high and low pressure gaseous environments. The condensate is drained through a common outlet port into the atmosphere or into a drain pipe.

10 Claims, 7 Drawing Sheets

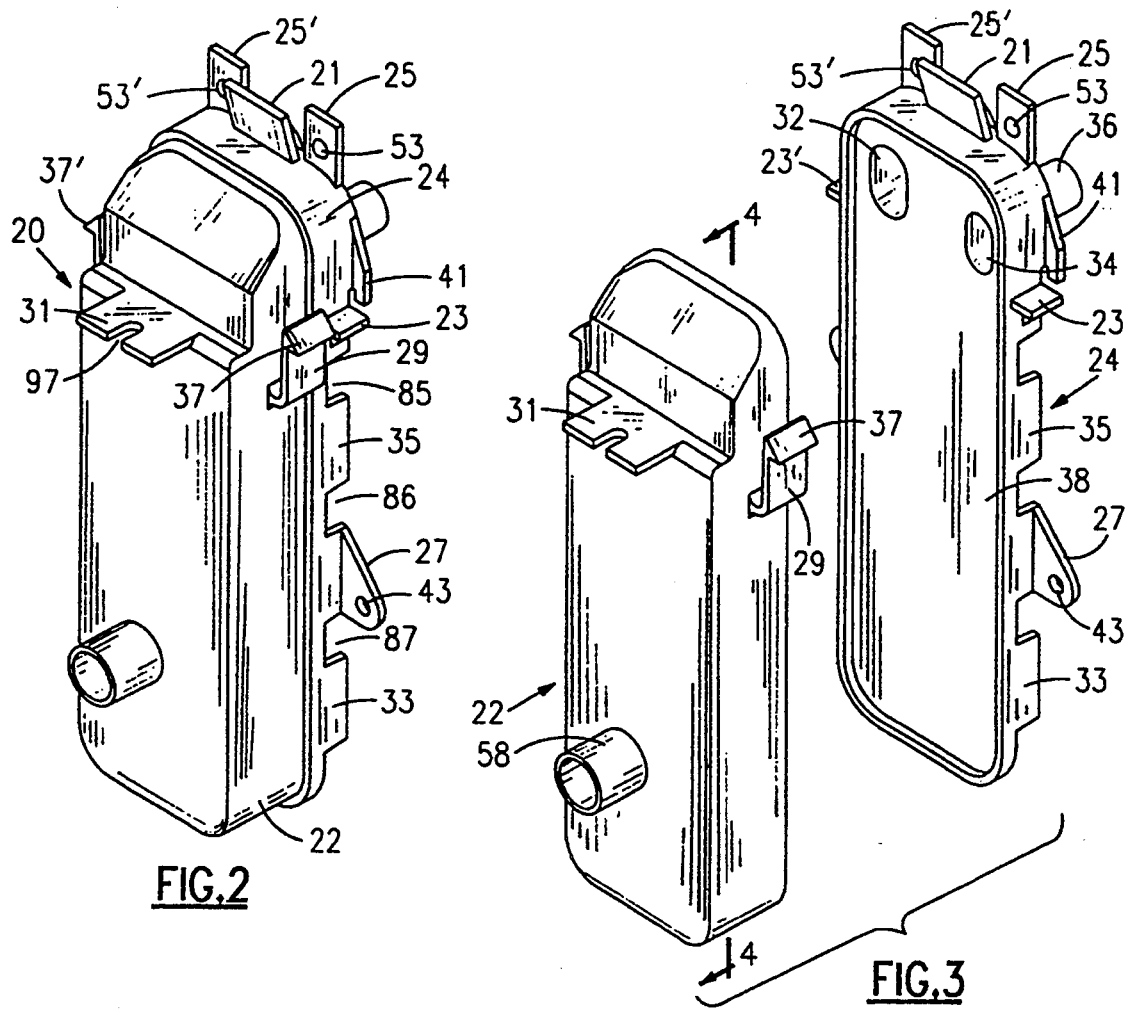
FIG. 2
FIG. 3
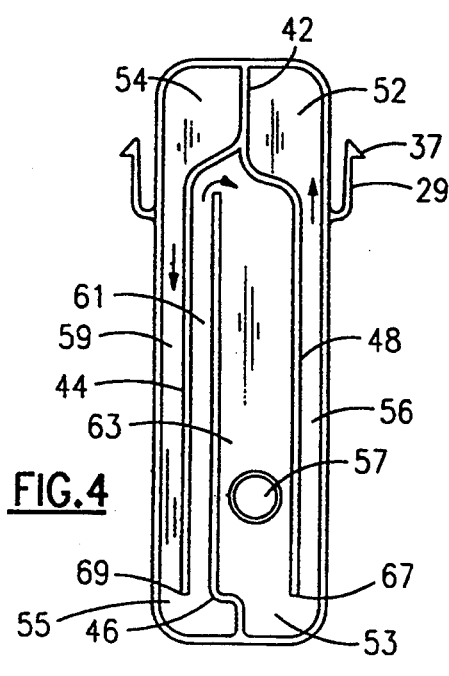
FIG. 4
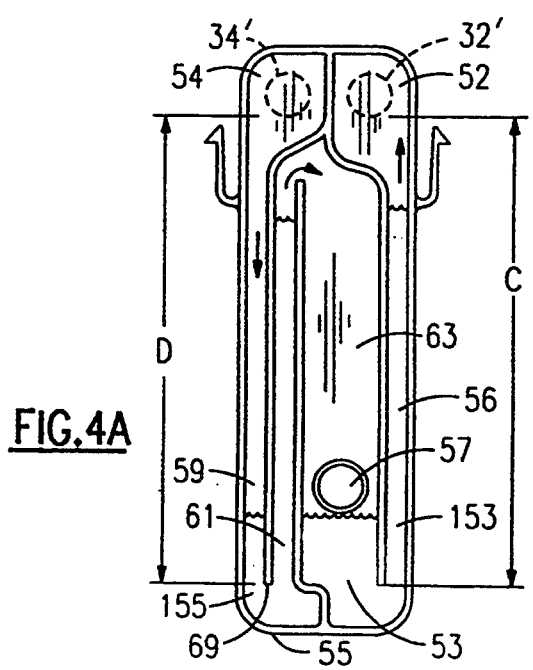
FIG. 4A

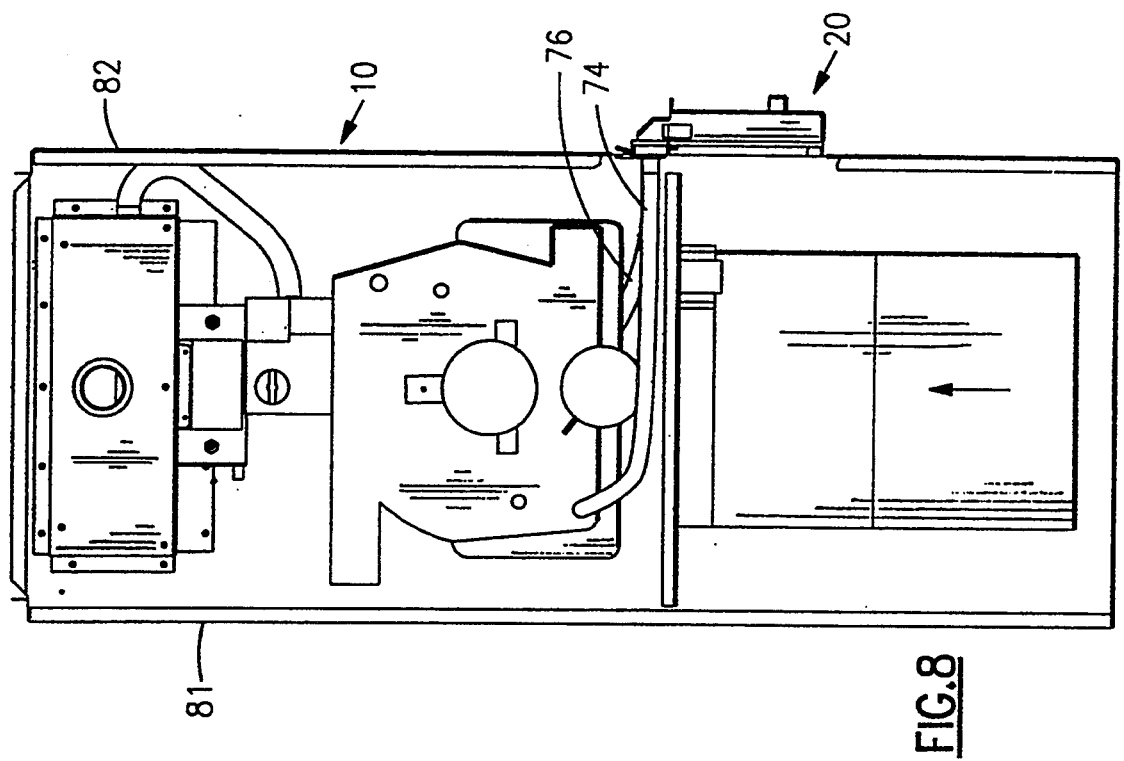
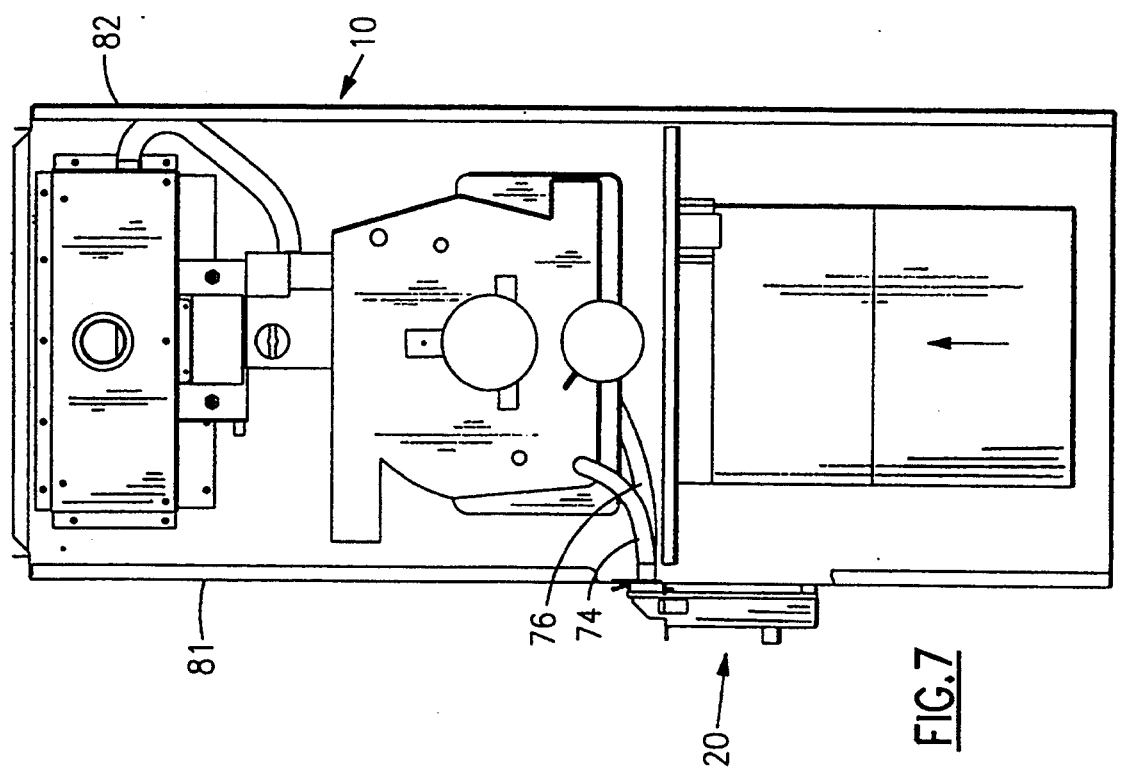

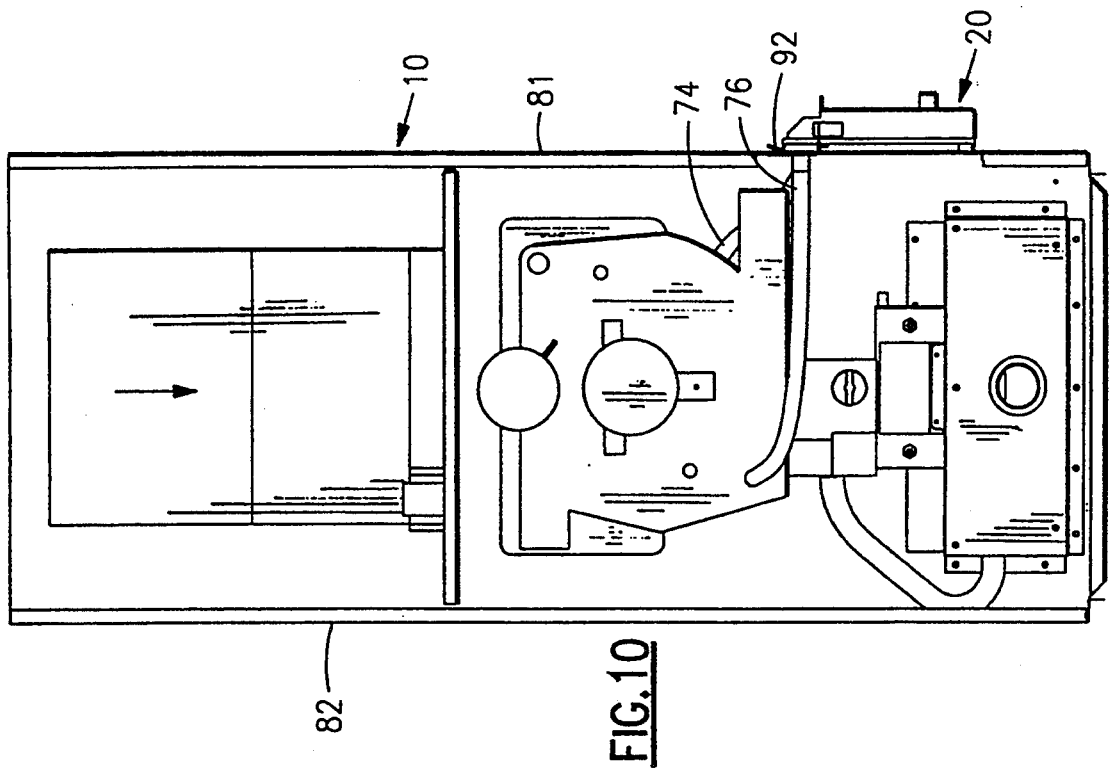
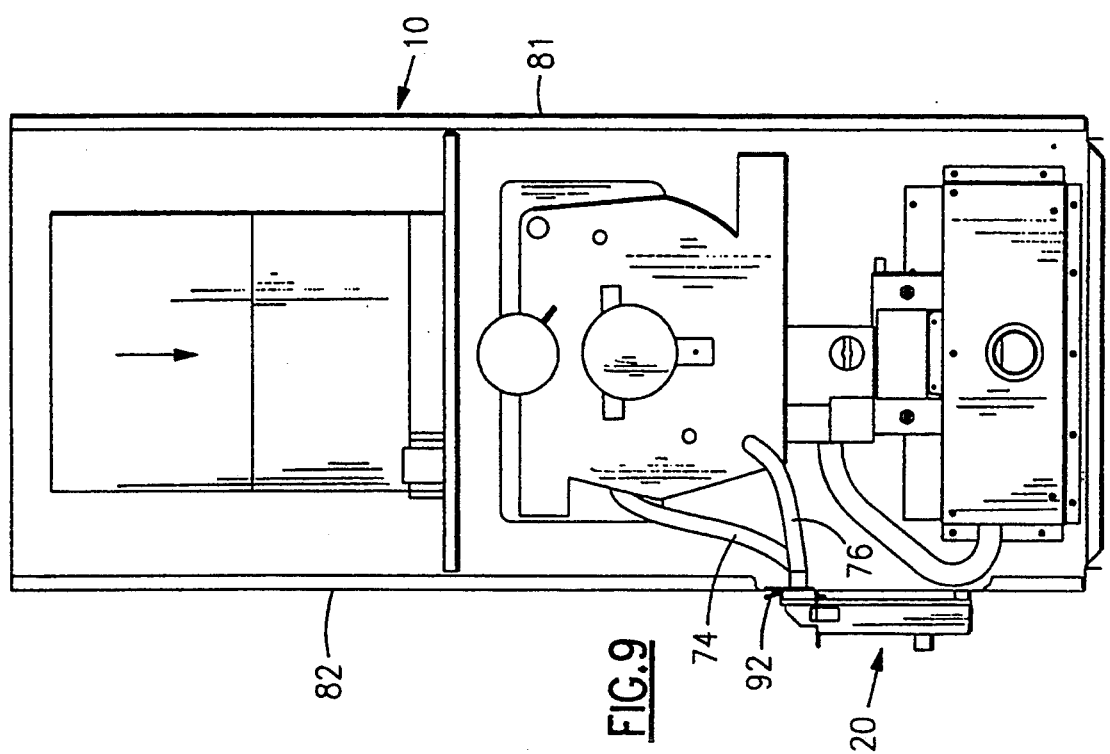

CONDENSATE TRAP FOR MULTI-POISE FURNACE

BACKGROUND OF THE INVENTION

1. Field of the Invention

This invention relates to a furnace for providing heated circulation air to an interior comfort space, and is more particularly directed to a condensate trap for a multi-poise forced air furnace of the type having a heat exchanger.

2. Description of the Prior Art

In conventional gas-fired forced air furnaces a thermostat senses the temperature in the comfort zone relative to a predetermined set point temperature. When the temperature is below the set point, the thermostat closes to supply thermostat ac power to the furnace as a call for heat. This initiates a sequence of events that ultimately causes the furnace to come on. An inducer motor is enabled to flow combustion air across the burners, and through a condensing heat exchanger, after which a gas valve is actuated to supply gas to the gas burners. An ignition device is also actuated to light the burners. A flame sensor then proves burner ignition and sends power to a burner delay timer. Then after a predetermined blower delay time, which varies with furnace design, the furnace blower is actuated. The blower moves circulating room air from a return air duct through the furnace heat exchanger to pick up heat from the heated combustion products (carbon dioxide and water vapor) from the gas burners. The heated circulate air then goes into a hot air plenum and is distributed through hot air ductwork back to the comfort space. When the comfort space air is warmed sufficient to reach the thermostat set point, the thermostat terminates the call for heat. When this happens the blower and burners go through a shut off sequence and the furnace awaits the next call for heat.

The present invention mainly deals with handling of large amounts of condensate that form in the condensing heat exchanger and also in the inducer. When the inducer motor is in operation a substantial step-up in pressure occurs between the condensing heat-exchanger and intake of the inducer on the one hand, and the outflow of the inducer on the other hand. Typically there is negative pressure (relative to atmospheric pressure) at the intake, and positive pressure at the outflow.

Older furnaces typically create positive pressure of about 1½ inches (3.8 cm) of water, and negative pressure of about 2½ inches (6.3 cm) of water, so that the trap only had to be 4 inches (10.2 cm) tall. Modern high flow furnaces can produce about 4 inches (10.2 cm) of positive pressure and 4 inches (10.2 cm) of negative pressure, requiring the trap to be at least 8 inches (20.3 cm) tall. An improved dual-sided condensate trap, which has reduced vertical height, is disclosed in my copending application Ser. No. 100,615, now U.S. Pat. No. 5,309,890.

Modern furnaces, such as forced air gas-fired condensing furnaces, are designed for multipoise applications. It is essential that the condensate trap operate in many supply air flow directions, i.e., upflow, downflow, horizontal left and horizontal right applications.

SUMMARY OF THE INVENTION

It is therefore a primary object of the present invention to provide a compact condensate trap that can simultaneously handle condensate from a source of negative pressure and a source of positive pressure and operate in a plurality of furnace orientations.

This and other objects of the present invention are attained by a furnace for supplying circulating heated air to an interior comfort space and having at least one burner, wherein an air flow of heated gas is moved by an inducer through a condensing heat exchanger and is exhausted therefrom through an exhaust vent to an outside environment. The furnace has a trap for condensate forming in the air flow, the condensate trap simultaneously receiving liquid condensate forming in first and second gaseous environments that are respectively under positive and negative pressure relative to a third gaseous environment. The trap comprises a container having first and second inlet ports through an upper portion thereof that respectively access the first and second gaseous environments, a first fluid reservoir in a bottom portion thereof, and an outlet port through a lower portion thereof for conducting overflow of the first fluid reservoir into a drain and into the third gaseous environment. The trap has a first duct extending from the first inlet port and terminating in the interior of the container below a surface of the first liquid reservoir to accommodate a first liquid reservoir that establishes a first liquid seal between the first gaseous environment and the third gaseous environment. There is a second duct extending from the second inlet port to an interior of the container which contains a second liquid reservoir in a recurved or a reflexively directed portion thereof, a portion of the second liquid reservoir being disposed above the outlet port to establish a second liquid seal between the second gaseous environment and the third gaseous environment.

According to another aspect of the invention the furnace has at least one gas-fired burner, and the air flow comprises combustion products thereof, and the output port is at atmospheric pressure.

BRIEF DESCRIPTION OF THE DRAWING

For a better understanding of these and other objects of the present invention, reference is made to the detailed description of the invention which is to be read in conjunction with the following drawings, wherein:

FIG. 2 is a enlarged perspective view of the condensate trap shown in FIG. 1;

FIG. 3 is an exploded perspective view of the trap shown in FIG. 2;

FIG. 4 is a sectional view taken on line 4—4 of FIG. 3;

FIG. 4A is another view along line 4—4 of FIG. 3 illustrating the disposition of liquid reservoirs therein;

FIGS. 7 and 8 are sectional views of a furnace configured for upflow with the condensate trap installed thereon;

FIGS. 9 and 10 are sectional views of a furnace configured for downflow with the condensate trap installed thereon;

DESCRIPTION OF THE PREFERRED EMBODIMENT

Figure 1:
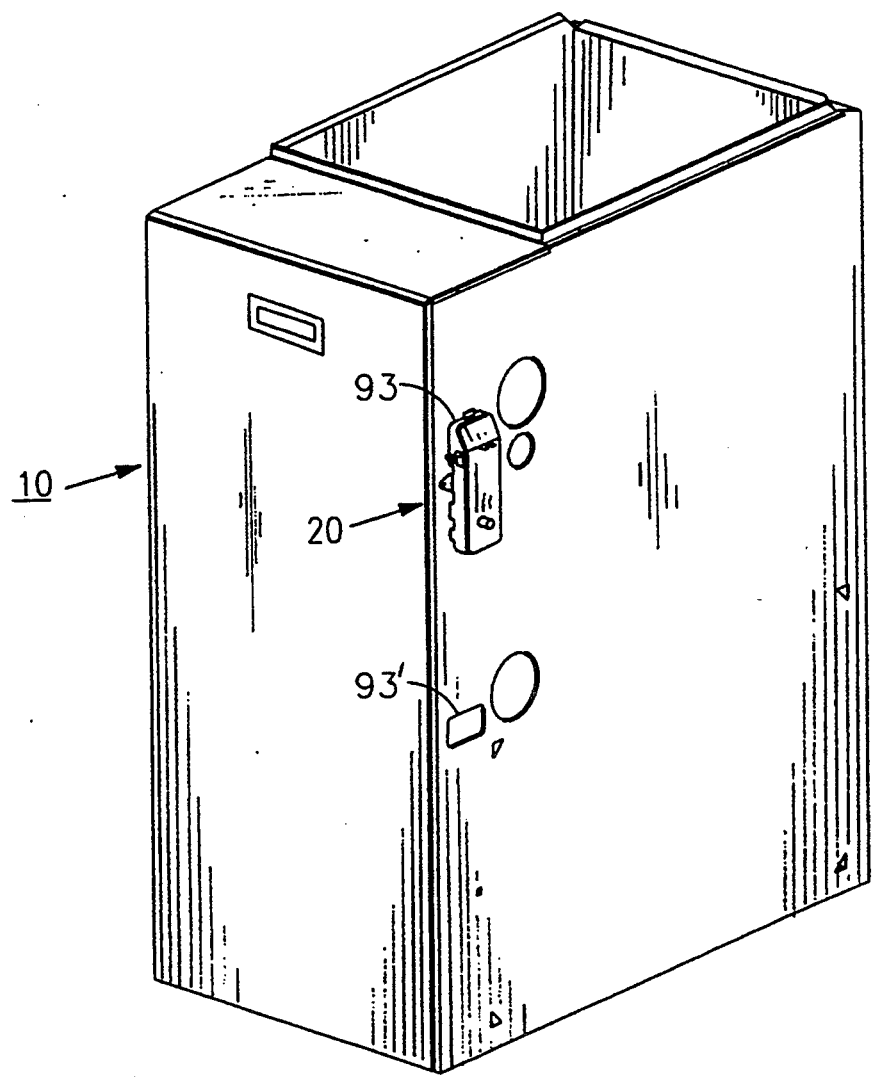
FIG. 1 is a perspective view of the cabinet of a gas-fired furnace having an externally attached condensate trap in accordance with the invention.
Figure 13:
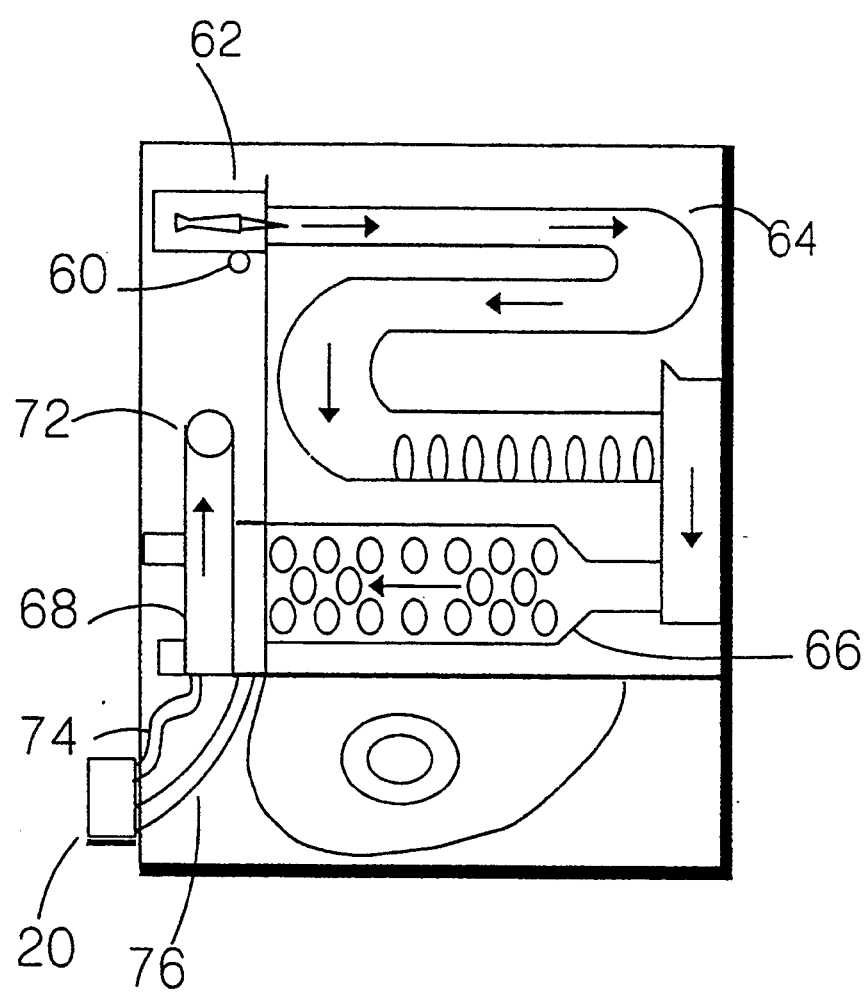
FIG. 13 is a diagrammatic view of a gas fired furnace suitable for use with the invention.

Turning now to FIG. 1 of the Drawing, there is shown a gas-fired furnace 10. Externally attached thereto is a condensate trap 20 in accordance with the invention. Access to gaseous environments in the interior of the furnace 10 is provided by access port 93. As shown in the diagrammatic view of FIG. 13. such furnaces are provided with an gas flow path extending from an air intake 60, in turn passing at least one gas-fired burner 62, through a primary heat exchanger 64, and a condensing heat exchanger 66. Inducer 68 draws gases along the flow path and exhausts them into the external environment via exhaust vent 72. When the inducer 68 is in operation the gas pressure in the portion of the flow path at the intake of the inducer 68 is negative with respect to atmospheric pressure, and a positive gas pressure is generated within the inducer 68 itself and in those regions intermediate the inducer 68 and the exhaust vent 72, as well as in a vent pipe attached to vent 72 (not shown). As a result of temperature changes in the condensing heat exchanger, condensate forms in the flow path proximate the intake of the inducer, and within the inducer itself. Tubes 74, 76 extend from the area of the inducer intake (known as a collector box) and from the inducer to externally mounted condensate trap 20 to conduct condensate therethrough.

Condensate trap 20 is shown in more detail in FIGS. 2–4. It is constructed of two fitted casings 22, 24 that assemble to form an enclosed chamber. A gasket (not shown) may be optionally placed therebetween to assure an adequate seal. The casings are provided with suitable mounting arrangements, discussed below in more detail, that can accommodate a variety of furnace geometries and mounting positions.

As best shown in FIG. 3, casing 24 is provided with intake ports 32, 34 for communication with negative and positive gaseous environments respectively. Adapters 36, 36' receive tubes 74, 76 (FIGS. 7–11) to provide a sealed communication path to their respective gaseous environments. Of course the trap 20 and tubes 74, 76 are arranged so that condensate drains generally in a downward direction through the tubes into the trap, and the trap is mounted in a vertically oriented direction so that fluid pools in its bottom portion as shown in FIG. 4A. The internal face 38 of casing 24 is flat.

The opposing casing 22 is provided with raised internal septa 42, 44, 46, 48 that meet internal face 38 when the casings 22, 24 are assembled to subdivide the enclosed chamber into a system of labyrinthine ducts or passages having fluid-tight partitions therebetween. Gaskets or the like may be used to assure a proper seal. Casing 24 also has an outlet port 57 served by tube adapter 58. In the upper portion of FIG. 4 relatively enlarged portions 52, 54 oppose inlet ports 32, 34 for receiving gas under negative and positive pressure respectively and condensate. As can be seen in FIG. 4A, liquid reservoir 153 is pooled in the bottom portion 53 of subchamber 63 and is displaced along duct 56 toward portion 52 in accordance with a pressure difference between the gaseous environments of subchamber 63 and portion 52. Reservoir 153 thus forms a liquid seal between the gaseous environment in portion 52 and the gaseous environment above the surface of reservoir 153 in subchamber 63. The latter environment communicates with the atmosphere via outlet port 57.

Another passage 59 leads from enlarged portion 54 downward to a lower region 55, where it recurves to continue in an upward course (shown as segment 61), finally debouching into the upper portion of subchamber 63, above the level of outlet 57. A second fluid reservoir 155 is pooled in bottom portion 55, and is displaced by the positive pressure prevailing above the gas-liquid interface in enlarged portion 54. The reservoirs 153, 155 do not commingle, except that as reservoir 155 fills, it overflows at the upper extreme of segment 61 into reservoir 153.

It will be evident that reservoir 153 is directly augmented by condensate entering from the low pressure gaseous environment via inlet port 32, and is indirectly augmented by condensate originating from the high pressure gaseous environment entering via inlet port 34, and filling reservoir 155 to an overflow condition. Reservoir 153 overflows through outlet 57 to a drain attached to adapter 58 (not shown). The drain is substantially at atmospheric pressure; however it could be at any pressure intermediate the pressures that are found in the high and low pressure gaseous environments.

The trap 20 is capable of withstanding a negative pressure differential indicated by dimension C in FIG. 4A, defined by the lower margin of inlet port 32, and by the lower end 67 of duct 56. In FIG. 4A the dotted circles 32', 34' correspond to the positions of circles 32, 34 respectively. The trap can withstand a positive pressure differential indicated by dimension D, defined by the lower margin of inlet port 34 and the lower end 69 of the partition separating the recurved portion of ducts 59 and 61. The larger of dimensions C and D is a constraint on the minimum vertical height of the trap 20. The vertical height of trap 20 can be given by the formula $$H = M + K$$

wherein

H is the vertical height of the trap;

M is the greater of dimensions C and D; and

K is a constant.

The constant K represents the clearances for the inlet ports, and for liquid to flow beneath the lower portions of the partitions between ducts 59, 61, and beneath the partition separating duct 56 and subchamber 63, and also incorporates the thickness of the casings 22, 24.

Turning now to FIGS. 5, and 7–10, multipoise furnace 10 is operating in a downflow configuration, air flow indicated by an arrow in each figure. Condensate trap 20 can be mounted on either of the side walls 81 (FIGS. 7, 8), 82. Tube 74 conducts condensate from the low pressure side of the inducer intake to inlet port 32 (FIG. 3) of the trap 20, and tube 76 leads from the high pressure side of the inducer intake to inlet port 34 and the high pressure portion of the trap 20.

Figure 5:
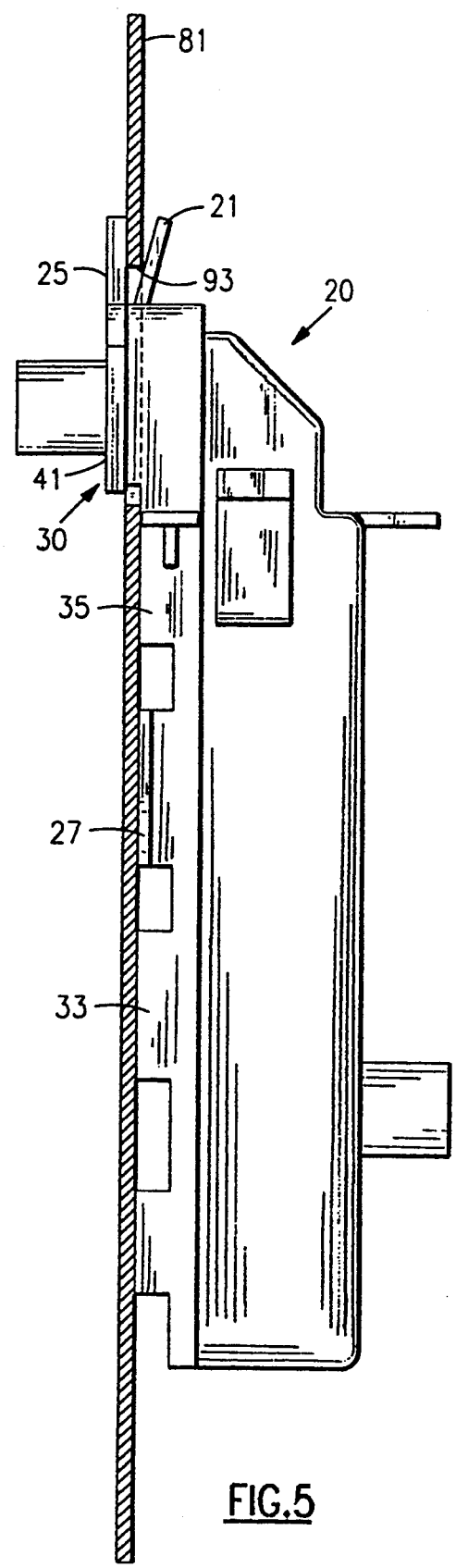
FIGS. 5 and 6 are enlarged sectional views of furnaces having vertical and horizontal airflow arrangements respectively with the condensate trap shown in FIG. 2 installed therein.
Figure 12:
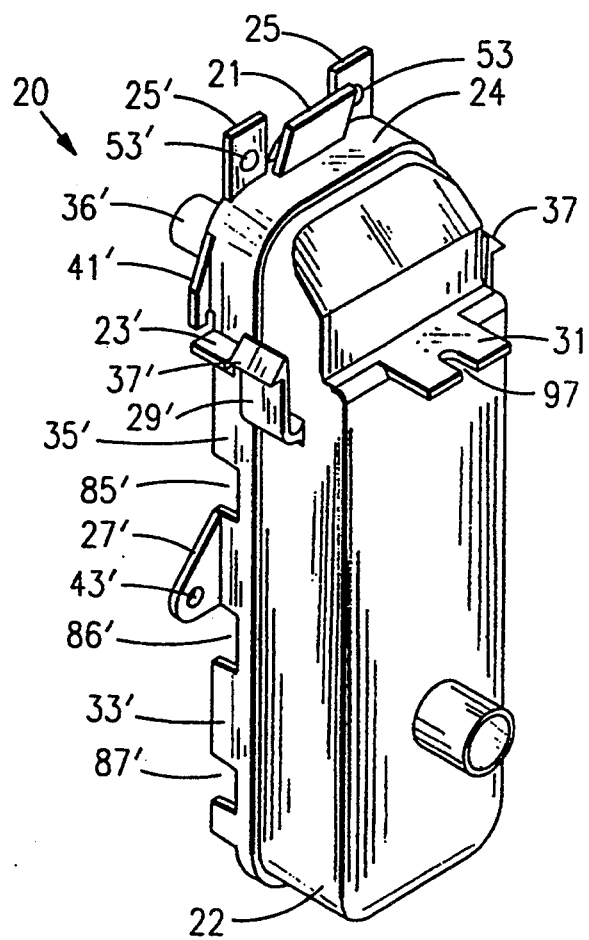
FIG. 12 is another enlarged perspective view of the device shown in FIG. 2.

While FIG. 5 illustrates side wall 81. the trap 20 can be similarly mounted on side wall 82, the arrangement of tubing 74, 76 varying in accordance with internal asymmetry in the furnace 10. Also the arrangement shown in FIG. 5 can equally accommodate a 180 degree reversal of trap 20 in order to maintain proper vertical orientation of the trap when the furnace is installed in the opposite direction of vertical airflow. Trap 20 is provided with an upper mounting flange 25, an upper side flange 41, a lower side flange 27, and spacers 33, 35. Corresponding upper flange 25', upper side flange 41', lower side flange 27', and spacers 33', 35' are disposed on the opposite side of the trap 20 (FIG. 12). A tab 21 projects obliquely upward from the top surface of the trap 20. A frontal portion 30 of the upper portion of trap 20 is inserted through a suitable aperture 92 (FIG. 9) in side wall 81 and seated thereon between upper mounting flanges 25, 25' and tab 21 to limit relative vertical movement between the trap 20 and the side wall 81, and also prevent horizontal shifting of the upper portion of the trap 20. When the trap 20 has been thus seated, upper side flange 41 and lower side flange 27 lie flush against opposite surfaces of side wall 81 to further immobilize the trap 20. The flanges 21, 23, 23', 25, 25', 41, 41', 27, 27' can optionally be bonded to the side wall by welding, an adhesive, or other suitable methods, or can be optionally further secured by screws, bolts, or rivets placed through holes 43, 43' formed in the flanges.

Referring to FIGS. 2 and 12, spacers 33, 35, lower side flange 27 and the wall of outer casing 24 define slots 85, 86, 87 therebetween. Slots 85', 86', 87' are similarly defined on the opposite side of casing 24. Slots 85, 86, and 87 are slightly offset in a vertical direction from corresponding slots 85', 86', 87'. The purpose of the offset is to allow a heating tape or coil (not shown), well known in the art, to be threaded therethrough in a spiral fashion. The heating tape or coil is desirable when the trap 20 is subjected to freezing temperatures, in order to prevent the fluids therein from solidifying and defeating the function of the trap. Lower side flange 27' is slightly offset vertically from lower side flange 27 to accommodate the slot offsets; however lower side flanges 27, 27' function identically when trap 20 is engaged with side wall 81. Heat tape can also be coiled and placed against the rear surface of half casing 24, between the spacers 33, 35 and 33', 35'.

Figure 6:
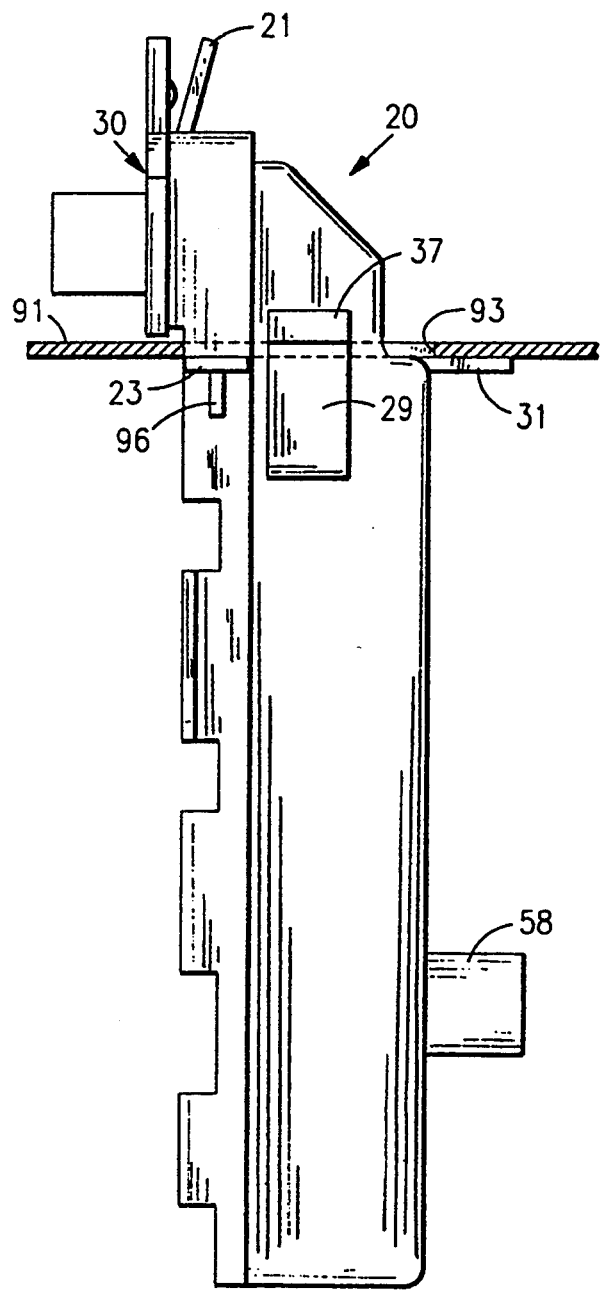
Figure 11:
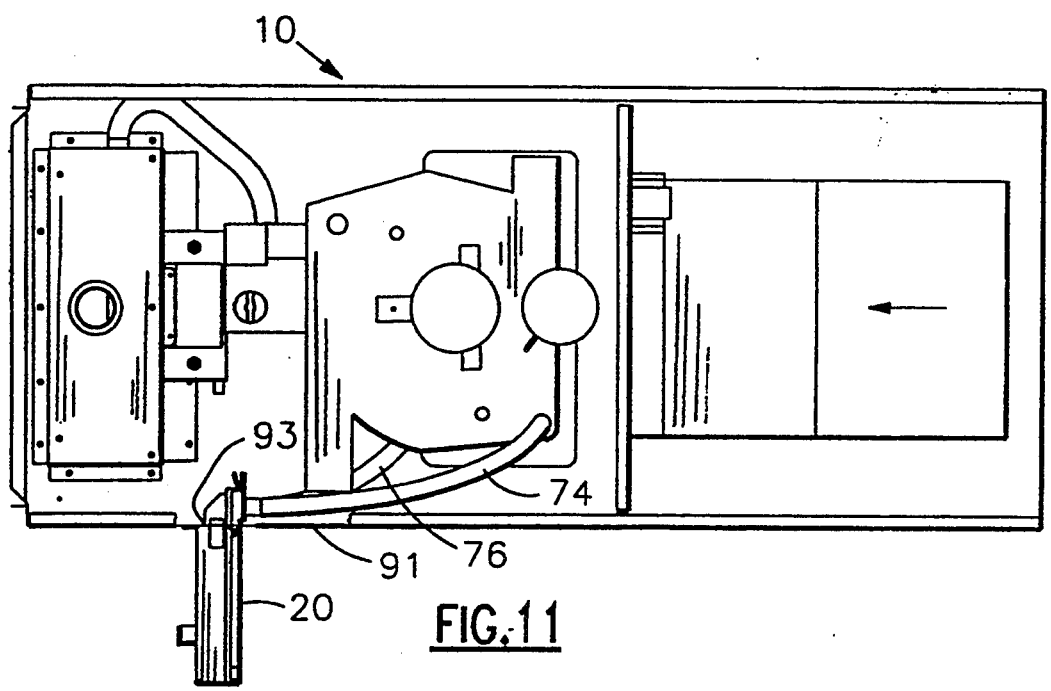
FIG. 11 is a sectional view of a furnace configured for horizontal left flow with the condensate trap installed thereon.

Referring now to FIGS. 6, and 11, there is shown a multi-poise furnace installed for in a horizontal airflow application. While FIG. 11 displays left horizontal airflow, it should be understood that right horizontal airflow can be equally provided by rotating the furnace 180°. Trap 20 is mounted on a bottom wall 91 of the furnace, its upper portion being inserted through a suitable aperture 93, so that the inlet ports and adapters 36 are in the interior of the furnace 10. The inlet ports 32, 34 are connected to tubing 74, 76 as discussed above. Spring clips 29, 29' engage the wall 91, and urge the trap 20 in opposite lateral directions away from the edges bounding the aperture 93. This spring action, along with outwardly directed arms 37, 37' located at the termination of the clips 29, 29', cooperate to firmly seat the trap 20 in the aperture 92. Side flanges 23, 23' and rear flange 31 all bear on the lower surface of wall 91 and prevent the trap 20 from moving upward relative to the wall 91, while arms 37, 37' bear on the upper surface 91, supporting the trap 20 and cooperating to immobilize it against pivotal motion with respect to the wall 91. It is desirable to reinforce flanges 23, 23' with gussets 96, 96'. Rear flange 31 and the flanges 23, 23' can optionally be secured to the lower surface of wall 91 by adhesive, welding, or other suitable bonding. Rear flange 31 is also provided with a slot 97 for a retaining bolt or the like to optionally further stabilize the trap.

To use the trap, it is only necessary to mount it on the furnace as described above, and to connect tubing 74, 76 to the adapters 36, 36'. Adapter 58 can be connected to a suitable drain to carry away excess liquid as the furnace operates and the trap accumulates condensate. Also a conventional heat tape can be wound about the trap through slots 85, 85', 86, 86', 87, 87'.

We thus provide an improved condensate trap that can be mounted on a multipoise furnace irrespective of the air flow direction therein and capable of handling condensate originating from gaseous environments under positive and negative pressure with respect to the atmosphere.

While this invention has been explained with reference to the structure disclosed herein, it is not confined to the details set forth and this application is intended to cover any modifications and changes as may come within the scope of the following claims:

What is claimed is:

1. In a furnace for supplying circulating heated air to an interior comfort space and having at least one burner wherein an air flow of heated gas is moved by an inducer through a condensing heat exchanger and is exhausted through an exhaust vent to an outside environment, the furnace having a trap for condensate forming in the air flow, said condensate trap simultaneously receiving liquid condensate forming in first and second gaseous environments that are respectively under positive and negative pressure relative to an external gaseous environment; wherein the improvement comprises:

said trap comprising a container having first and second inlet ports through an upper portion thereof that respectively access the first and second gaseous environments, a first liquid reservoir in a bottom portion thereof, and an outlet port through a lower portion of said trap for conducting overflow of said first liquid reservoir into said external gaseous environment;

a first duct extending from said first inlet port and terminating in said interior of said container below a surface of said first liquid reservoir; whereby said first liquid reservoir establishes a first liquid seal between said first gaseous environment and said external gaseous environment;

a second duct extending from said second inlet port to an interior of said container and having a second liquid reservoir in a reflexively directed portion thereof, a portion of said second liquid reservoir being disposed above said outlet port to establish a second liquid seal between said second gaseous environment and said external gaseous environment;

first mounting means disposed on said trap for mounting said trap on a vertical wall of said furnace; and second mounting means disposed on said trap for alternately mounting said trap on a horizontal wall of said furnace.

2. The apparatus according to claim 1, wherein said first mounting means comprises:

at least two upper mounting flanges, projecting upwardly above a top surface of said trap;

a tab, projecting generally upward above said top surface, and offset from a plane of said upper mounting flanges, a portion of said vertical wall being seated between said upper mounting flanges and said tab, a first surface of said vertical wall engaging said upper mounting flanges and a second surface of said vertical wall engaging said tab;

at least two upper side flanges, disposed on opposite lateral walls of said trap and engaging said first surface of said vertical wall; and a lower flange engaging said second surface of said vertical wall.

3. The apparatus according to claim 2, wherein said lower flange comprises at least two lower side flanges, disposed on opposite lateral walls of said trap and engaging said second surface of said vertical wall.

4. The apparatus according to claim 1, wherein said second mounting means comprises:

two spring clips disposed on opposite lateral surfaces of said trap, said spring clips each engaging an edge of said horizontal wall and urging said trap away from said horizontal wall, said clips each having an outwardly directed arm that bears on an upper surface of said horizontal wall for limiting downward vertical motion of said trap relative thereto;

means engaging a lower surface of said horizontal wall for limiting upward vertical motion of said trap relative thereto.

5. The apparatus according to claim 4, wherein said member comprises:

two side arms, disposed on opposite sides of said trap; and a rear flange, projecting in a generally horizontal direction from a rear wall of said trap.

6. The apparatus according to claim 1, wherein said reflexively directed portion is recurved.

7. In a furnace for supplying circulating heated air to an interior comfort space and having at least one burner wherein an air flow of heated gas is moved by an inducer through a condensing heat exchanger and is exhausted therefrom through an exhaust vent to an outside environment, the furnace having a trap for condensate forming in the air flow, said condensate trap simultaneously receiving liquid condensate forming in first and second gaseous environments that are respectively under positive and negative pressure relative to an external gaseous environment; wherein the improvement comprises:

said trap comprising a container having first and second inlet ports through an upper portion thereof that respectively access the first and second gaseous environments, a first liquid reservoir in a bottom portion thereof, and an outlet port through a lower portion thereof for conducting overflow of said first liquid reservoir into said external gaseous environment;

a first duct extending from said first inlet port and terminating in said interior of said container below a surface of said first liquid reservoir; whereby said first liquid reservoir establishes a first liquid seal between said first gaseous environment and said external gaseous environment;

a second duct extending from said second inlet port to an interior of said container and having a second liquid reservoir in a reflexively directed portion thereof, a portion of said second liquid reservoir being disposed above said outlet port to establish a second liquid seal between said second gaseous environment and said external gaseous environment; and means for mounting said trap on a selected horizontal and vertical wall of said furnace, comprising:

at least two upper mounting flanges, projecting upwardly above a top surface of said trap;

a tab, projecting generally upward above said top surface, and offset from a plane of said upper mounting flanges, a portion of a vertical wall of said furnace being seated between said upper mounting flanges and said tab, a first surface of said vertical wall engaging said upper mounting flanges and a second surface of said vertical wall engaging said tab;

at least two upper side flanges, disposed on opposite lateral walls of said trap and engaging said first surface of said vertical wall; and at least two lower side flanges, disposed on opposite lateral walls of said trap and engaging said second surface of said vertical wall;

two spring clips disposed on opposite lateral surfaces of said trap, said spring clips each engaging an edge of said horizontal wall and urging said trap away from said horizontal wall, said clips each having an outwardly directed arm that bears on an upper surface of said horizontal wall for limiting downward vertical motion of said trap relative thereto;

two side arms, disposed on opposite sides of said trap; and a rear flange, projecting in a generally horizontal direction from a rear wall of said trap.

8. The apparatus according to claim 7, further comprising a plurality of slots formed in a casing of said trap for receiving a heating tape therethrough.

9. The apparatus according to claim 7, wherein said upper mounting flanges, said upper side flanges, said lower side flanges are bonded to said vertical wall of said furnace, and said side arms and said rear flange are bonded to said horizontal wall of said furnace.

10. The apparatus according to claim 7, wherein said reflexively directed portion is recurved.

* * * * *